May 7, 1963  R. H. BOLTON  3,089,044
ELECTROMAGNETIC TRANSDUCER DEVICE
Filed May 31, 1960  2 Sheets-Sheet 1

INVENTOR
ROBERT H. BOLTON
BY
ATTORNEY

May 7, 1963 R. H. BOLTON 3,089,044
ELECTROMAGNETIC TRANSDUCER DEVICE
Filed May 31, 1960 2 Sheets-Sheet 2

INVENTOR
ROBERT H. BOLTON
BY
ATTORNEY

United States Patent Office 3,089,044
Patented May 7, 1963

3,089,044
ELECTROMAGNETIC TRANSDUCER DEVICE
Robert H. Bolton, Huntington, N.Y., assignor to Sperry Rand Corporation, Great Neck, N.Y., a corporation of Delaware
Filed May 31, 1960, Ser. No. 32,780
7 Claims. (Cl. 310—36)

The present invention relates to an electromagnetic transducer device and particularly to a combined electromagnetic device which functions as a signal generator to provide an electrical signal in accordance with movement between the relative parts thereof and also a torquer to provide movement between the relative parts thereof in accordance with an electrical signal supplied thereto. The invention is particularly applicable to apparatus having sensitive elements, such as gyroscopes.

The disadvantages of prior art electromagnetic transdudcers when utilized on gyroscopes particularly on floated gyroscopes where the transducer has a moving iron rotor movable with the gyroscope float or sensitive element include:

(1) Either electrical centering or extremely close machining is required.
(2) Radial side forces are always present.
(3) Reaction torques at null, and reaction torques as a function of angle, are always present.
(4) The linearity of the torquer and the pick-off is severely limited by the non-linearity of the B–H curve of the core material.
(5) Hysteresis effects limit torquer accuracy.
(6) Coil winding time constants are quite high.
(7) The torquer requires a fixed field supply.

The present invention overcomes the aforementioned disadvantages and has the following advantages over the prior art moving iron rotor devices:

(1) Coercion torques and side forces are substantially eliminated.
(2) Because of its extreme simplicity, it has an unusually high order of reliability.
(3) The pick-off portion has an extremely high signal-to-noise ratio which is further improved at higher frequencies because of the greatly reduced capacity coupling between the primary and secondary. Output impedance is very low.
(4) The torquer portion produces extremely linear results without hysteresis effects and without fixed field circuitry.
(5) The torquer coil time constants are low enough to permit digital torquing.
(6) There is a high level of resistance to stray magnetic fields, such as spin-motor leakage and earth's field.
(7) The pick-off portion can be made to function as a negative spring and thereby compensate for elastic restraint torques on the gyroscope float.
(8) Limited radial displacements of the gyroscope float do not impair performance.

It is a primary object of the present invention to provide a substantially coercion-free electromagnetic transducer device wherein stray magnetic fields have substantially no influence upon the output provided thereby.

It is a further object of the present invention to provide an electromagnetic transducer device having a high order of reliability which is simple and inexpensive to manufacture and has good linearity of its output.

It is an additional object of the present invention to provide an electromagnetic transducer device wherein slight radial displacements of the relatively moving parts do not impair the output performance.

The above and other objects are achieved by the combined pick-off and torquer of the present invention which consists of three coaxial members comprising an inner stationary stator having an I-shaped core of magnetic material wound with an A.C. excitation coil and symmetrically disposed permanent magnets, all mounted on a common support structure, the curved extremities of which define a circle, an outer hollow cylindrical lamination stack encircling the stator and forming a magnetic flux return path for the pick-off and the torquer. The lamination stack is in spaced relation with the stator thereby forming an air gap therebetween. A hollow cylindrical sleeve is rotatably disposed in the air gap and supports the pick-off output coils and the torquer input coils. In a gyroscope, for example, the stator and the lamination stack are mounted on the gyroscope housing while the rotatable sleeve is connected to rotate with the gyroscope float or sensitive element.

Further objects will appear from the following specification and claims when read in conjunction with the drawings in which:

For purposes of example the present invention will be applied to a gyroscope having a floated sensitive element although it will be appreciated that the invention is equally applicable to providing combined pick-off and torquing functions or individual pick-off or torquing functions in other applications.

Figure 1:
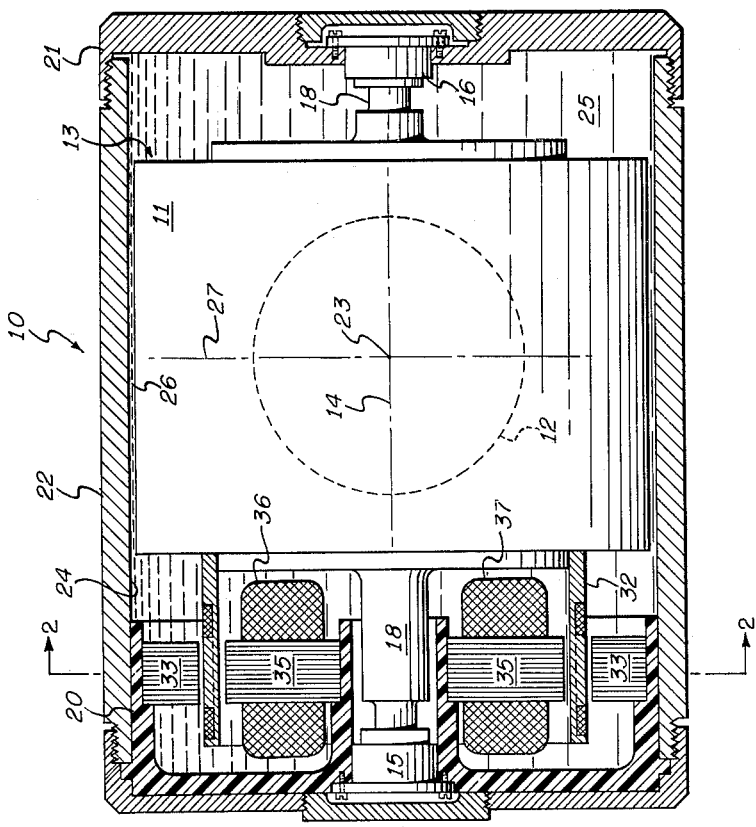
FIG. 1 is a vertical section on an enlarged scale of a gyroscope including the combined pick-off and torquing device of the present invention.

Referring now to FIG. 1, a single-degree-of-freedom integrating gyroscope 10 includes a sensitive element 11 within which a gyro rotor 12, shown in dotted lines, is hermetically sealed within a cylindrical float 13. The gyroscope 10 has an output or longitudinal axis 14 around which the sensitive element 11 is rotatable by means of spaced bearings 15 and 16 that cooperate with shafts 17 and 18, respectively, the latter extending from opposite extremities of the sensitive element 11. The bearings 15 and 16 are mounted in spaced end caps 20 and 21, respectively, which form the enclosures for a gyroscopic housing 22. The housing 22 is coaxially disposed with respect to the longitudinal axis 14 and encloses the sensitive element 11. The gyro rotor 12 spins within the float 13 about a horizontal axis 23 that is perpendicular to the longitudinal axis 14.

The space within the housing 22 between the outer surface of the cylindrical float 13 of the sensitive element 11 and the inner surface of the housing 22 is filled with a flotation fluid 25 which surrounds and supports the sensitive element 11. The outer diameter of the cylindrical float 13 is slightly less than the inner diameter of the hollow cylindrical central portion 24 of the housing 22 in order that a thin film 26 of flotation fluid 25 therebetween provides the integrating function due to the viscous shear effects of the fluid 25.

The purpose of the gyroscope 10 is to measure rotation about its input axis 27 and to provide an electrical output signal in response thereto having an amplitude and phase representative of the amount and direction respectively of the rotation. When the gyroscope 10 is rotated about its input axis 27, a gyroscopic torque is generated about its output axis 14 which causes rotation of the floated sensitive element 11 about the axis 14 with respect to the housing 22.

To provide an electrical output signal representative of the movement of the sensitive element 11 relative to the housing 22 around the axis 14, and to provide means for applying a torque to the sensitive element 11 around the axis 14, the gyroscope 10 includes the combined electromagnetic pick-off and torquing device 30 of the present invention. The device 30 will now be described with reference to FIGS. 1 to 4. The device 30 includes a stator 31, a rotor 32 cooperative with the stator 31, and a common magnetic flux return path member 33 as clearly shown in FIG. 4. In the preferred embodiment shown, the stator 31 includes a common stationary non-magnetic support member 34, an I-shaped core 35 of laminated magnetic material, first and second A.C. excitation coils 36 and 37, respectively, wound on the core 35, and first and second arcuate-shaped permanent magnets 38 and 39. The stator 31 has its longitudinal axis coincident with the longitudinal axis 14.

The support member 34 is rigidly connected to the end cap 20 of the housing 22. The support member 34 has a central opening 42 through which the shaft 17 extends in spaced relation with respect to the support member 34. The core 35 is mounted on the support member 34 by means of its central opening 43. The upper and lower extremities 40 and 41 respectively of the core 35 are diametrically opposed and curved for response to be explained. The A.C. excitation coil 36 is wound around the upper portion of the core 35 while the excitation coil 37 is wound around the lower portion of the core 35. The excitation coils 36 and 37 are identical and connected to each other in series aiding and also connected to a source of A.C. power 44. The permanent magnets 38 and 39 are also mounted on the support member 34 in diametrically opposed relationship with respect to each other. Preferably, the magnets 38 and 39 are identical and symmetrically disposed on opposite sides of the core 35. The extremities 55 and 56 of the magnet 38 and the extremities 57 and 58 of the magnet 39 extend outwardly and are curved in order that they cooperate with the curved extremities 40 and 41 of the core 35 to define a circle.

Figure 2:
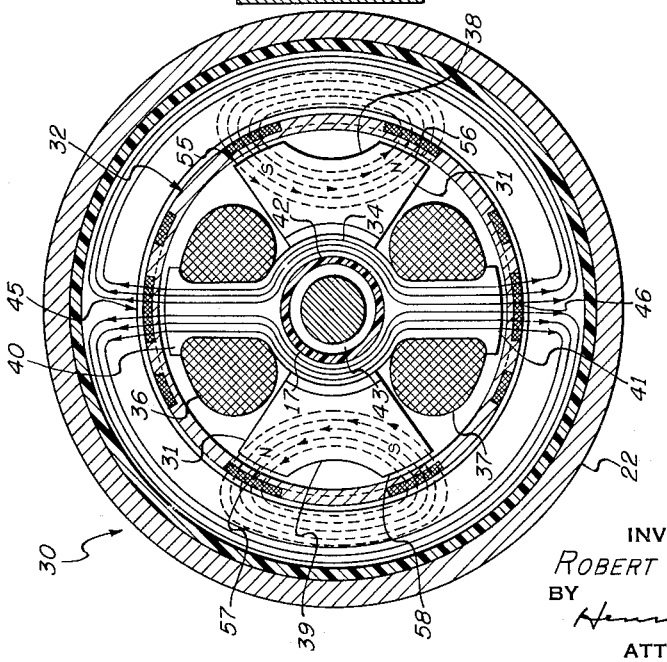
FIG. 2 is an end sectional view of the gyroscope of FIG. 1 taken along line 2—2 of FIG. 1 and including lines indicating the magnetic flux path.
Figure 3:
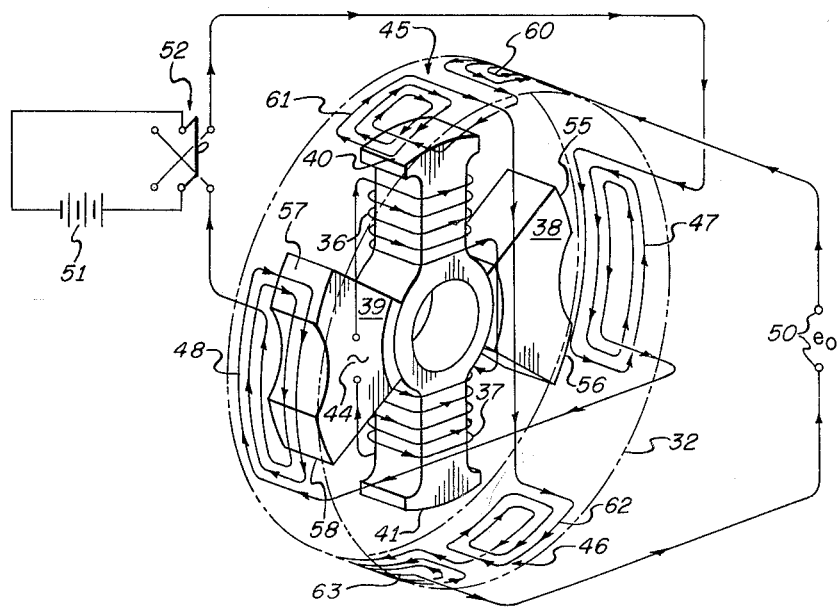
FIG. 3 is a schematic perspective view showing the relationship of the coils and the stator of the combined pick-off and torquing device.
Figure 4:
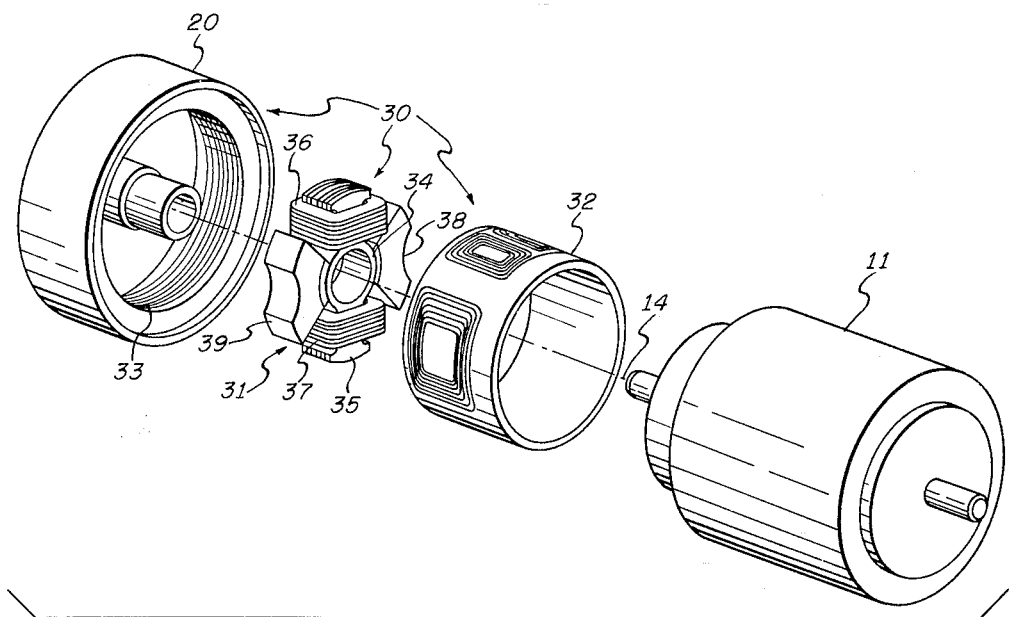
FIG. 4 is an exploded perspective view of the elements of the combined pick-off and torquing device as applied to the gyroscope of FIG. 1.

The rotor 32 is a hollow cylindrical member that encircles the stator 31. The inside diameter of the rotor 32 is slightly greater than the diameter of the circle defined by the curved extremities of the core 35 and the magnets 38 and 39 thereby providing a small air gap therebetween. First and second arcuate-shaped pick-off coils 45 and 46 respectively, and first and second torquer coils 47 and 48 form a part of and are embedded in the rotor 32. As shown in FIG. 3, each of the pick-off coils 45 and 46 consists of two rectangularly wound identical wire loops 60, 61 and 62, 63, respectively similar to standard meter coils, connected in series opposition with their winding directions opposite. The pick-off coils 45 and 46 are series connected to provide an additive output signal at the pick-off output terminals 50. The pick-off coils 45 and 46 are cooperative with the upper and lower extremities 40 and 41 respectively of the core 35, as viewed in FIG. 2, to provide a null output from the output terminals 50 when the coils 45 and 46 are centered with respect to the core 35 in a manner to be more fully explained.

The arcuate-shaped torquer coils 47 and 48 are rectangular and cooperative with the curved extremities 55, 56 and 57, 58 of the permanent magnets 38 and 39, respectively. The coils 47 and 48 are connected to each other in series aiding relationship and also to a D.C. source, such as the battery 51, through a reversing switch 52. The rotor 32 is rigidly connected to the sensitive element 11 and coaxial with respect to the axis 14. With the coils 47 and 48 centered with respect to the magnets 38 and 39 respectively, as shown in FIG. 2, there is no torque produced on the rotor 32 and thus no torque applied to the sensitive element 11 around axis 14 as will be explained more fully. The coils 45, 46, 47 and 48 are symmetrically disposed on the rotor 32.

The common magnetic flux return path member 33 comprises a hollow cylindrical lamination stack of magnetic material which encircles a portion of the rotor 32. The flux return path member 33 is stationary by virtue of its being mounted on the end cap 20 of the housing 22. The inside diameter of the return path member 33 is slightly greater than the outside diameter of the rotor 32 thereby providing a small air gap therebetween. The rotor 32 is rotatably disposed in the air gap between the member 33 and the circle defined by the extremities of the core 35 and the magnets 38 and 39. Preferably, the member 33 has substantially the same dimension in the direction of the axis 14 as the cooperative portion of the core 35.

In operation, when the gyroscope 10 is initially turned on and the flotation fluid 25 is being heated by conventional means not shown, the sensitive element 11 is prevented from rotating around the output axis 14 by more than ±10° by means of a slot and key arrangement, not shown. When the flotation fluid 25 reaches a predetermined temperature, the reversing switch 52 is closed to permit current to flow from the battery 51 to energize the coils 47 and 48. The direction of the current flow is dependent upon the position of the switch 52 and is determined by the direction in which it is desired to rotate the sensitive element 11. Depending upon the direction of current flow through the coils 47 and 48, the magnetic flux, shown in dotted lines in FIG. 2, induced by the opposed permanent magnets 38 and 39 will be cut by the current in the coils 47 and 48 producing a force on the rotor 32 which creates a moment on the sensitive element 11 around the axis 14 in a direction to cause the axis 27 to become vertical.

When the sensitive element 11 has its axis 27 vertical, the pick-off coils 45 and 46 are centered with respect to the extremities 40 and 41 respectively of the core 35. In this condition, the magnetic flux lines linking each of the loops 60, 61, 62 and 63 are equal, as shown in solid lines in FIG. 2, and the voltage induced in the loop 60 is equal and opposite to that induced in the loop 61 since they are connected in series opposition. Likewise, the voltage induced in the loop 62 cancels the voltage induced in the loop 63 thereby providing zero output voltage at the terminals 50.

When the gyroscope 10 is rotated about its input axis 27, the gyro rotor 12 will precess causing rotation of the sensitive element 11 around the output axis 14. The movement of the sensitive element 11 carries the rotor 32 and the coils 45 and 46 mounted thereon to a new position that is not centered with respect to the core 35, causing the magnetic flux lines linking the loops 60 and 63 to be greater than those linking the loops 61 and 62, for example. This creates an unbalance in the voltage induced in each of the loops of the coils 45 and 46 resulting in an output signal at the terminals 50 having an amplitude and a phase representative of the magnitude and direction of the rotation of the sensitive element 11 from its centered position. Due to the dual arrangement of the pick-off device, the amplitude of the signal will be representative of twice the angle through which the sensitive element 11 has rotated.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A combined pick-off and torquing device comprising pick-off means including an I-shaped core of magnetic material, an excitation coil disposed on said core, and first and second output coils cooperative with first and second extremities respectively of said core, torquing means including first and second permanent magnets, and first and second input coils cooperative with said first and second magnets respectively, a common stationary non-magnetic support member for supporting said core and said magnets, a common magnetic flux return path member for providing a magnetic flux return path for said pick-off means and said torquing means, said flux return path member being in spaced relation with respect to said core and said magnets thereby defining an air gap therebetween, and a common movable element disposed within said air gap supporting said pick-off output coils and said torquer input coils for movement relative to said core and said magnets.

2. A combined pick-off and torquing device comprising pick-off means having I-shaped laminated core of magnetic material, A.C. excitation coil means wound on said core, and first and second output coils cooperative with first and second extremities respectively of said core, torquing means having first and second permanent magnets, and first and second D.C. excitation input coils cooperative with said first and second magnets respectively, a common stationary non-magnetic support member for supporting said core and said magnets, a common laminated magnetic flux return path member for providing a magnetic flux return path for said pick-off means and said torquing means, said flux return path member being in spaced relation with respect to said core and said magnets thereby defining an air gap therebetween, and a common movable element disposed within said air gap supporting said pick-off output coils and said torquer input coils for movement relative to said core and said magnets.

3. A combined pick-off and torquing device comprising pick-off means having an I-shaped core of magnetic material, A.C. excitation coils wound on said core, and first and second output coils cooperative with first and second extremities respectively of said core, torquing means having first and second arcuate-shaped permanent magnets and first and second D.C. excitation input coils cooperative with the extremities of said first and second magnets respectively, the extremities of said core and said magnets being symmetrically disposed and curved to thereby define a circle, a common stationary non-magnetic support member for supporting said core and said magnets, said support member having a longitudinal axis, a common circular magnetic flux return path member for providing a magnetic flux return path for said pick-off means and said torquing means, said flux return path member being in spaced relation with respect to said core and said magnets thereby defining a circular air gap therebetween, and a common circular rotatable element disposed within said air gap supporting said pick-off output coils and said torquer input coils for rotation relative to said core and said magnets around said longitudinal axis, said rotatable magnetic element and said flux return path member being coaxially disposed with respect to said longitudinal axis.

4. A symmetrical combined pick-off and torquing device comprising pick-off means having an I-shaped core of magnetic material, A.C. excitation coil means wound on said core, and first and second arcuate-shaped output coils cooperative with first and second extremities respectively of said core, torquing means having first and second arcuate-shaped permanent magnets, and first and second arcuate-shaped input coils cooperative with the extremities of said first and second magnets respectively, the extremities of said core and said magnets being symmetrically disposed and curved to thereby define a circle, a common stationary non-magnetic support member for symmetrically supporting said core and said magnets, said support member having a longitudinal axis, a common hollow cylindrical magnetic flux return path member for providing a magnetic flux return path for said pick-off means and said torquing means, said flux return path member being disposed coaxially with respect to said longitudinal axis and in spaced relation with respect to said circle thereby defining a circular air gap therebetween, and a common hollow cylindrical rotatable element coaxially disposed within said air gap supporting said pick-off output coils and said torquer input coils for rotation around said longitudinal axis, said coils being symmetrically disposed on said element.

5. A combined pick-off and torquing device comprising a pick-off having a core of magnetic material, an excitation coil wound on said core and an output coil cooperative with said core, a torquer having a permanent magnet and an input coil cooperative with said permanent magnet, a common stationary non-magnetic support member for supporting said core and said magnet, a common magnetic flux return path member for providing a magnetic flux return path for said pick-off and said torquer, said flux return path member being in spaced relation with respect to said core and said magnet thereby defining an air gap, and a common movable element disposed in said air gap supporting said pick-off output coil and said torquer input coil for movement relative to said core and said magnet.

6. A pick-off device comprising an I-shaped stationary core of magnetic material, an A.C. excitation coil disposed on said core, first and second output coils cooperative with first and second extremities respectively of said core, said core having a longitudinal axis, a stationary hollow cylindrical magnetic flux return path member for providing a magnetic flux return path for said pick-off, said member being disposed in spaced relation with respect to said core extremities thereby defining an air gap, and a rotatable hollow cylindrical element disposed in said air gap supporting said output coils for rotation around said axis relative to said core whereby an output signal is provided from said output coils having an amplitude and phase representative of the extent and direction of the movement of said element with respect to said core.

7. A torquing device comprising a stationary non-magnetic support member having a longitudinal axis, first and second arcuate-shaped permanent magnets mounted in opposed spaced relation on said support member, first and second excitation coils cooperative with the extremities of said first and second magnets respectively, a stationary hollow cylindrical magnetic flux return path member for providing a magnetic return path for said torquing device, said member being disposed in spaced relation with respect to said magnet extremities thereby defining an air gap and a rotatable hollow cylindrical element disposed in said air gap supporting said excitation coils for rotation around said axis relative to said magnets whereby a torque is applied to said element in accordance with the magnitude and direction of excitation supplied to said coils.

References Cited in the file of this patent
UNITED STATES PATENTS 2,700,739    Orlando _____ Jan. 25, 1955
2,746,300    Seaman _____ May 22, 1956